United States Patent [19]

Masamori et al.

[11] Patent Number: 5,227,784
[45] Date of Patent: Jul. 13, 1993

[54] SYSTEM FOR DETECTING AND DETERMINING RANGE OF TARGET VEHICLE

[75] Inventors: Ichiro Masamori; Hideyuki Sasaki, both of Hiroshima, Japan

[73] Assignee: Mazda Motor Corporation, Hiroshima, Japan

[21] Appl. No.: 801,580

[22] Filed: Dec. 5, 1991

[30] Foreign Application Priority Data

Dec. 10, 1990 [JP] Japan .................... 2-407228
Jan. 18, 1991 [JP] Japan .................... 3-004588

[51] Int. Cl.$^5$ .................... G08G 1/16; G01S 13/00
[52] U.S. Cl. .................... 340/903; 340/901;
340/435; 340/436; 340/557; 180/167; 342/54;
342/70; 342/81
[58] Field of Search ............ 340/903, 901, 904, 435,
340/436, 902, 555-557; 180/167; 342/27, 44,
47, 48, 53, 54, 56, 61, 70, 81, 96

[56] References Cited

U.S. PATENT DOCUMENTS

| 4,670,845 | 6/1987 | Etoh | 340/903 |
| 4,757,450 | 7/1988 | Etoh | 340/904 |
| 4,833,469 | 5/1989 | David | 340/903 |
| 5,026,153 | 6/1991 | Suzuki et al. | 340/903 |
| 5,091,726 | 2/1992 | Shyu | 340/903 |

FOREIGN PATENT DOCUMENTS 57-155700 9/1982 Japan.
58-131575 8/1983 Japan.

Primary Examiner—Donnie L. Crosland
Attorney, Agent, or Firm—Keck, Mahin & Cate

[57] ABSTRACT

A target detecting and range determining system for an automobile detects a distance between two vehicles travelling in front of and behind each other and includes a range detector using a range determining signal directed toward and reflected by a target vehicle. The system also includes a controller for controlling the range detector so that it receives a proper reflection of the range determining signal when a primary vehicle changes its travelling direction relative to the target vehicle.

5 Claims, 7 Drawing Sheets

SYSTEM FOR DETECTING AND DETERMINING RANGE OF TARGET VEHICLE

BACKGROUND OF THE INVENTION

1. Field of the Invention

This invention relates to a system for detecting and determining the range of a target vehicle from an automotive vehicle in which the system operates and, more particularly, to a target vehicle detecting and range determining system which receives a signal reflected from a target vehicle located in front of the automotive vehicle equipped with such a system.

2. Description of Related Art

A hazard detecting system for an automotive vehicle which detects hazards and obstructions, such as a leading automotive vehicle which travels ahead of a vehicle including such a system, is well known in the art. Such a system typically sets off an alarm after judging a received signal wave to be a hazard detecting signal wave. Conventionally, the received signal wave is determined to be such a hazard detecting signal wave only when outputs of two sets of received waves, such as supersonic waves reflected by a hazard, are identical. Such a hazard detecting system is known from, for instance, Japanese Unexamined Patent Publication No. 58-131,575.

Using such a hazard detecting system in an automotive vehicle to avoid front-end collisions or accidents on a highway is obviously highly desirable; accordingly, a variety of vehicle distance detecting apparatuses have recently been developed. One such apparatus compares a minimum allowed or critical vehicle distance, estimated in accordance with vehicle velocity, with an actual distance between an automotive vehicle and a subject or target vehicle travelling ahead of the automotive vehicle. A warning is provided to the driver of the automotive vehicle by, for example, an alarm light or a warning sound if the actual distance is less than the critical vehicle distance. Such a hazard detecting system is known from, for instance, Japanese Unexamined Patent Publication No. 57-155,700.

Such vehicle distance detecting systems, however, lack the ability to detect the actual distance between vehicles accurately when the frequency of a transmitted radar wave is the same for two vehicles running in opposite directions around a bend. The systems are unable, in this situation, to discriminate between a radar wave which is reflected from a target vehicle and a radar wave which is transmitted directly from the target vehicle.

To solve this problem, appropriately polarized radar waves can be used. Such enables discrimination of the radar waves of one vehicle from those of another vehicle simply by determining differences in the directions of polarization between the waves transmitted from the vehicles. However, systems employing such polarized waves typically are extremely expensive because the equipment necessary to effect polarization of the radar waves is quite expensive.

Another problem typically found in hazard detecting systems is degradation of traceability of a target vehicle on a winding, a curved, or a steeply inclined road. More specifically, in systems which employ a laser radar to determine the range or measure the distance between vehicles, the output of a laser radar is limited to a certain range to avoid a harmful influence on human bodies. In these systems, the traceability of a target vehicle is improved by controlling the divergence of the laser beam. By way of example, a laser beam of a conventional hazard detecting system could form a spot which is approximately 3.5 meters in diameter at a distance of approximately 100 meters from the laser radar. Degradation of target traceability typically occurs on winding or steeply inclined roads because the spot formed by the laser beam is too small in diameter. If the spot formed by the laser beam is in fact too small, the target will pass out of the spot when it runs on a winding or steeply inclined road, even if the target could be tracked easily on a straight road by the laser beam.

SUMMARY OF THE INVENTION

It is one object of the present invention to provide an improved target detecting and range determining system for an automotive vehicle which is capable of continuously tracking a target vehicle even if the travelling direction of the target vehicle changes relative to a primary vehicle, i.e., a vehicle having the target detecting and range determining system.

It is another object of the present invention to provide a target detecting and range determining system for an automotive vehicle which is able to discriminate between signals which are reflected from and signals which are directly emitted by a target vehicle.

The foregoing objects are accomplished, according to the present invention, by providing a target detecting and range determining system for an automotive vehicle (i.e., a "primary" vehicle) which includes a particular range determining means for transmitting a first range signal at different frequencies, directing the range signal toward a target vehicle, and receiving a second range signal, as a distance signal, reflected from the target vehicle as it travels in front of the primary vehicle, which is equipped with the target detecting and range determining system. The distance between the primary vehicle and the target vehicle is determined according to the time between transmission of the first range signal and reception of the second range signal and a phase difference between the first and second range signals. The system further includes a control means for controlling the range determining means so that it receives a reflected signal, i.e., the second range signal, even when the primary vehicle changes its travelling direction relative to the target vehicle.

In accordance with one aspect of the present invention, a target detecting and range determining system is provided with a range determining means having a signal transmitting lens means for directing a first range determining signal toward a target vehicle. The system also includes a signal receiving lens means for receiving a second range determining signal reflected from the target vehicle and a control means including (1) a relative direction detecting means for detecting a relative direction of travel between the primary vehicle and the target vehicle and providing a pattern or direction signal representative of a change of the relative direction of travel, and (2) a drive means for turning the signal transmitting lens means and receiving lens means together with respect to a direction in which the vehicle is travelling according to the pattern signal. In this way, the system can continuously track a target vehicle, even on a winding road.

In accordance with another aspect of the present invention, a target detecting and range determining system is provided with an identification means for generating a target identification signal. The target identification signal has a target identification frequency which is different from the frequencies of the first and second range signals. The target identification signals are superimposed on the range signals. Identification signals, different in frequency than the target identification signal, are determined from a reflected range determining signal to provide a control signal. A control means modulates the frequency of the range signal transmitted from the range determining means when the control signal is present so that a distance, based on a reflected range signal, can properly be found.

BRIEF DESCRIPTION OF THE DRAWINGS

The above and other objects and various features of the present invention will become apparent to those skilled in the art from the following description when considered in conjunction with the drawings, in which.

DETAILED DESCRIPTION OF THE PREFERRED EMBODIMENT

Figure 1:
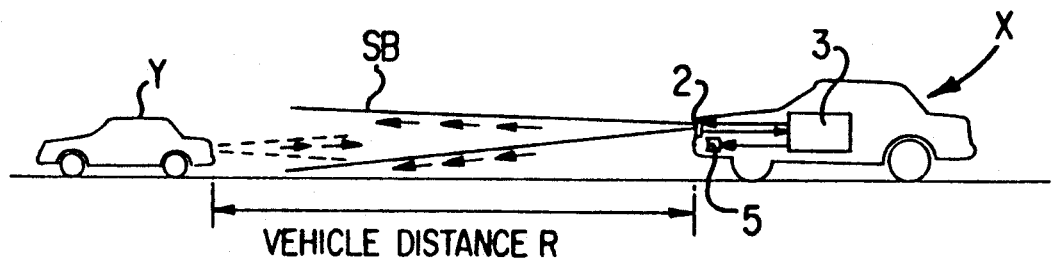
FIG. 1 is a schematic illustration showing detection of a distance between two vehicles.

Referring to the drawings in detail and, in particular, to FIG. 1, a target detecting and range determining system with an automatic target tracking feature in accordance with a preferred embodiment of the present invention is shown. The system is installed in a primary automotive vehicle X and uses, as a range determining signal wave, a pulse laser wave for detecting a target vehicle Y which travels at a distance R ahead of the primary vehicle X. The system thus detects the car-to-car distance between the two vehicles (referred to, for simplicity, as a vehicle distance). The target detecting and range determining system includes a laser head 2, which has, as a component, a lens array 2a, shown in detail in FIG. 3. The lens array will be described in detail later. The laser head 2 also includes a control unit 3 and a laser head adjuster 5.

Figure 2:
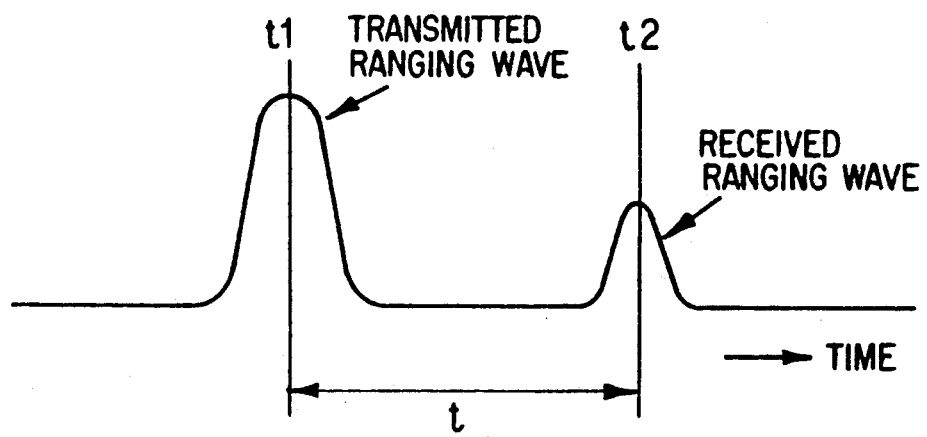
FIG. 2 is a time chart showing the principle enabling detection of a distance between two vehicles.

Laser head 2 is controlled, by pulse drive signals output from the control unit 3, to generate and emit, as a range determining wave, a laser pulse beam SB. The laser head 2 causes the range determining wave to diverge as it directs the range determining wave SB through its lens array 2a toward the target vehicle Y. The laser head 2 further receives the range determining wave SB, reflected by the leading target vehicle Y, through the lens array 2a and provides a distance signal to the control unit 3. Referring to FIG. 2, the control unit 3 calculates the vehicle distance R between the target vehicle Y and the primary vehicle X from the following formula:

$$R = (t \times c)/2$$

wherein
 c is the velocity of light; and
 t is a time between the emission and reception of the ranging wave SB by the laser head 2.

Control unit 3 further calculates a relative velocity between the two vehicles X and Y based on the vehicle distance and the velocity of the vehicle X (which can be detected in a well known manner). The laser head adjuster 5 adjusts or tilts the laser head 2 in two dimensions relative to a direction in which the vehicle X is travelling, namely, up and down and left and right.

Figure 3:
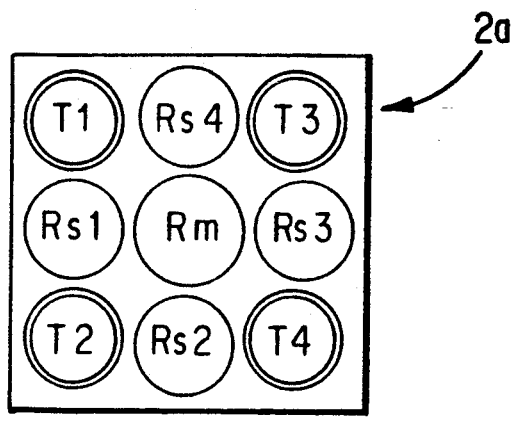
FIG. 3 is a schematic view of a laser head of a target detecting and range determining system of a preferred embodiment of the present invention.

Reference is now made to FIG. 3, which shows details of the lens array 2a of the laser head 2. The lens array 2a includes a main light receiving optical lens Rm, located at the center of the array; a group of, for instance, four auxiliary light receiving optical lenses Rs1–Rs4, located diametrically above, below, to the left of and to the right of the main lens Rm, respectively, and another group of, for instance, four light projecting optical lenses T1–T4 located diametrically obliquely above and below the main lens Rm, respectively. The main and auxiliary light receiving lenses Rm and Rs1–Rs4 are plastic Fresnel lenses and have a lens apertures of approximately 50 mm; the light projecting lenses T1–T4 are plastic aspherical lenses and have lens apertures of approximately 30 to 40 mm. The laser head 2 includes photodiodes 10 (see FIG. 5), located behind the main auxiliary light projecting lenses Rm and Rs1–Rs4, respectively, and laser diodes 8 (see FIG. 5), located behind the light projecting lenses T1–T4, respectively. The light projecting lenses T1–T4 provide divergent ranging waves SB forming beam spots which overlap to form a single light spot on an object.

Figure 4:
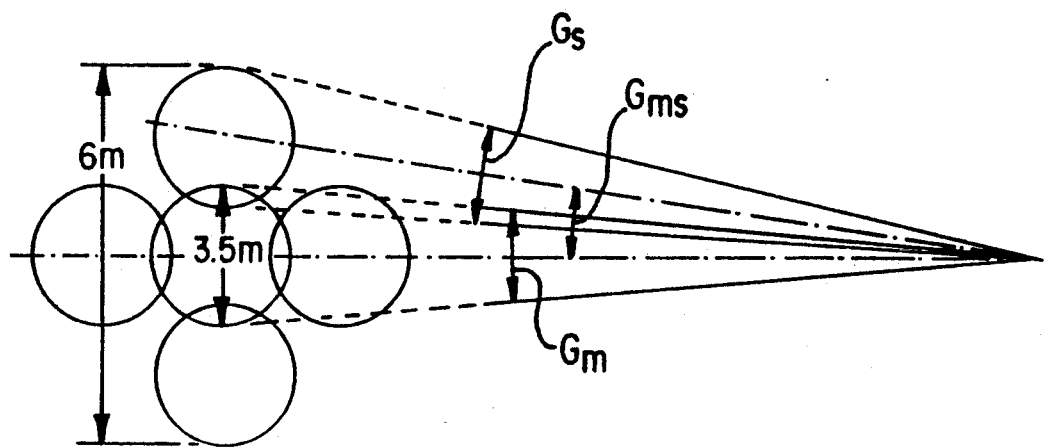
FIG. 4 is an illustration showing the pattern of a reflected range determining wave which is received by the laser head.

As shown in FIG. 4, convergent range determining waves incident to the light receiving lenses Rm, Rs1, Rs2, Rs3 and Rs4, after being reflected by an object, have a diameter of approximately 3.5 m at a distance of approximately 100 m from the laser head 2 and are focused on the photodiodes 10 behind the light receiving lenses Rm, Rs1, Rs2, Rs3 and Rs4, respectively. Each range determining wave has a convergent angle Gm or Gs of approximately 2 degrees or 35 mrad. An axis of the range determining wave SB incident to each auxiliary light projecting lens Rs intersects an axis of the range determining wave SB incident to the main light projecting lens Rm at an angle Gms. The angle Gms may, for instance, be approximately 1.7 degrees or 30 mrad. The convergent range determining waves partially overlap one another and are located within a spacial circular area having a diameter of approximately 6 m.

Figure 5:
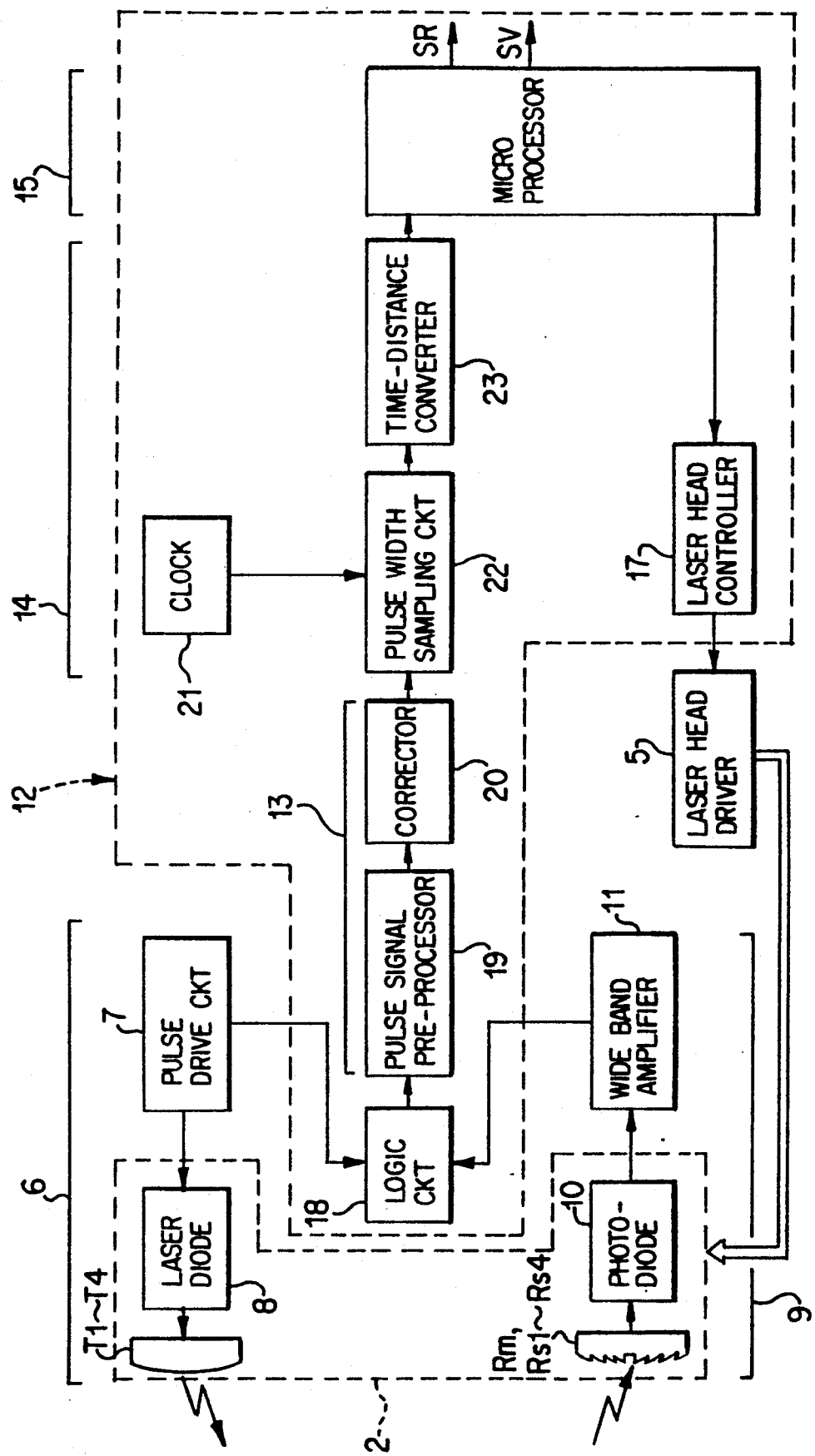
FIG. 5 is a block diagram illustrating the target detecting and range determining system in accordance with a preferred embodiment of the present invention.

Referring to FIG. 5, the control unit 3 of the target detecting and range determining system is shown in block diagram and includes range determining wave transmitter 6, a range determining wave receiver 9 and a controller 12. The range determining wave transmitter 6 includes a pulse drive circuit 7 which generates a pulse for exciting the laser diodes 8 and causing them to emit range determining waves to be projected forward through the light projecting lenses T1-T4. The range determining wave receiver 29 includes a wide band amplifier 11 for amplifying outputs from the photodiodes 10 on which range determining waves are focused by the main and auxiliary lenses Rm and Rs1 to Rs4. The controller 12 includes a pulse generator 13, a processor 14 for distance calculation, a signal processor 15 including, for instance, a general purpose microprocessor, and a laser head controller 17. The pulse generator 13 comprises a logic circuit, such as an AND circuit 18, a pulse signal pre-processor 19, and a corrector 20. Pulses and reflected signals are supplied from the pulse drive circuit 17 of the ranging wave transmitter 6 and from the wide band amplifier 11 of the range determining wave receiver 9. The distance calculation processor 14 comprises a clock generator 21, a pulse width sampler 22, and a time-to-distance converter 23.

An output from the time-to-distance converter 23 is processed in the signal processor 15 to provide signals SR and SV, representative of a vehicle distance R and a relative velocity, both between the target vehicle Y and the vehicle X. The signal processor 15 further provides the laser head controller 17 with a signal which enables the laser head adjuster 5 to adjust the laser head 2 in any desired direction.

Figure 6:
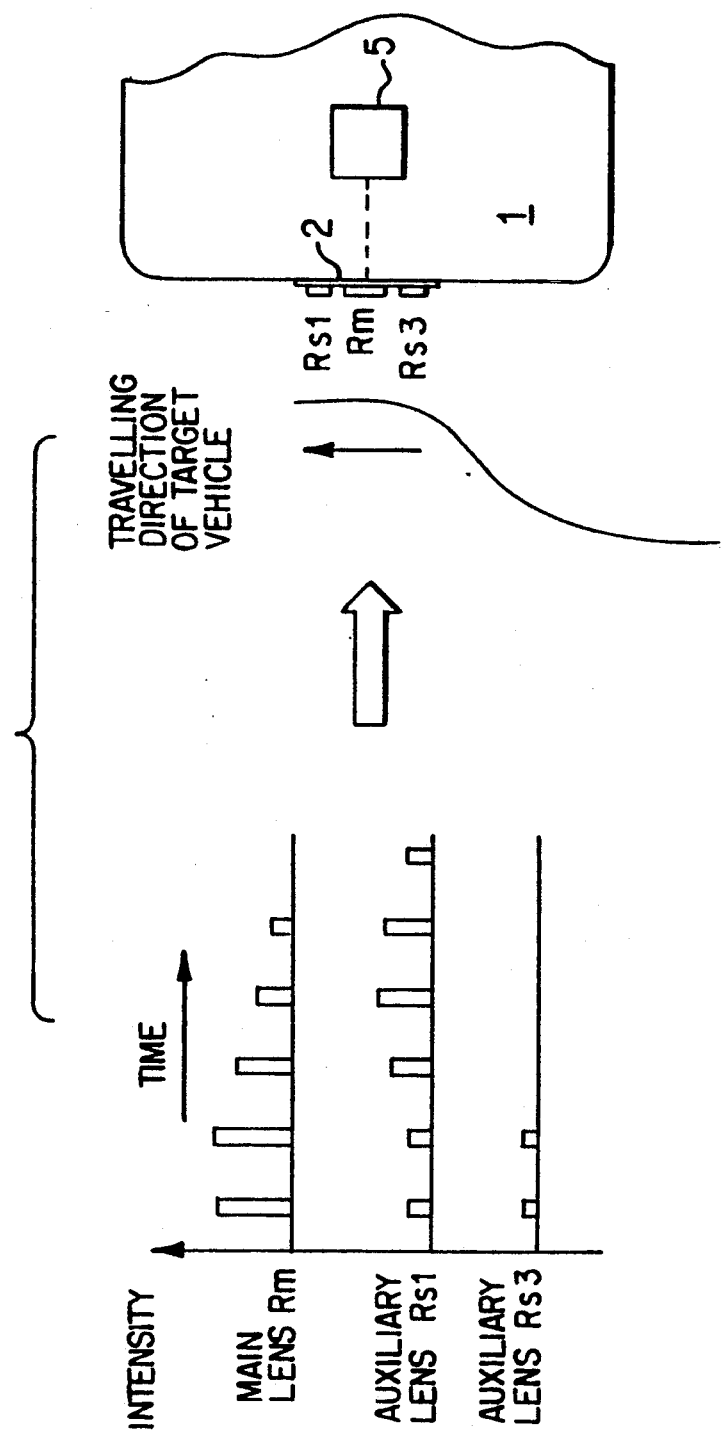
FIG. 6 is an illustration showing a manner in which a travelling direction of a vehicle can be detected.

When a target vehicle Y travels ahead on a straight path and the primary vehicle X, equipped with the target detecting and range determining system, travels on, for instance, a path which bends to the right, as shown in FIG. 6, intensities of the range determining waves incident to the main light receiving lens Rm and the auxiliary light receiving lenses Rs1 and Rs3, which are arranged in a horizontal straight line, vary after being reflected by the target vehicle Y as is also shown in FIG. 6. That is, an output of the photodiode 10 from a reflected range determining wave focused by the main lens Rm is initially at the highest intensity level. The output gradually drops in intensity with the passage of time. An output of the photodiode 10 from a reflected range determining wave focused by the auxiliary lens Rs1, disposed on the left hand side of the main lens Rm, is initially at a lower intensity level. This output gradually rises in intensity to the highest level, which is as high as the initial intensity of the output of the photodiode 10 behind the main lens Rm, and then gradually drops in intensity with the passage of time. An output of the photodiode 10 from a reflected range determining wave focused by the auxiliary lens Rs3, disposed on the right hand side of the main lens Rm, is initially at a lower level of intensity. This output drops gradually to a zero (0) level early, without any increase. This pattern of variation in intensity of the outputs of the photodiodes 10 indicates either that the target vehicle Y is turning left with respect to a travelling direction of the primary vehicle X relative to the primary vehicle X or that the primary vehicle X is turning right with respect to a travelling direction of the target vehicle Y relative to the target vehicle Y. If the pattern of intensity variation shown in FIG. 6 is detected, the signal processor 15 provides the laser head controller 17 with a control signal for causing the laser head adjuster 5 to turn the laser head 2 horizontally to the left. When either the target vehicle Y turns to the right, with respect to a direction in which the vehicle X travels, relative to the vehicle X or the vehicle X turns to the left relative to the target vehicle Y, the pattern of variation in intensity of the outputs of the photodiodes 10 shown in FIG. 6 is changed so that although the output of the photodiode 10 behind the main lens Rm varies in intensity in the way described above, the output intensities of the photodiode 10 behind the auxiliary lenses Rs1 and Rs3 are switched with each other. If the pattern of signal intensity variation is changed in this way, the signal processor 15 provides the laser head controller 17 with a signal which causes the laser head adjuster 5 to turn the laser head 2 horizontally to the right.

When the target vehicle Y travels on a slope which moves up and down, the same output intensity pattern variations as those provided by the main and auxiliary lenses Rm, Rs1 and Rs3 are generated by the main and auxiliary lenses Rm, Rs2 and Rs4. According to the patterns of signal intensity variations, it is determined whether the target vehicle Y moves up or down, with respect to a direction in which the primary vehicle X travels, relative to the vehicle X equipped with the target detecting and range determining system. The signal processor 15 then provides the laser head controller 17 with a signal which causes the laser head adjuster 5 to turn the laser head 2 vertically up or down.

As is apparent from the above description, the target detecting and range determining system of a primary vehicle can continuously home in on and track a target vehicle travelling ahead the vehicle equipped with the system, even on paths which bend or have up and down slopes.

Figure 9:
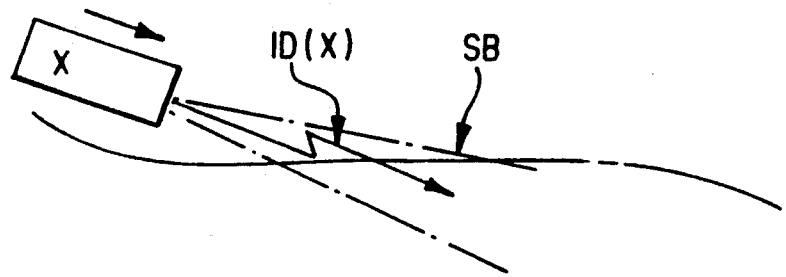
FIGS. 9, 10 and 11 are illustrations showing a relative travelling condition between the two vehicles travelling on a path which is "S" shaped.
Figure 10:
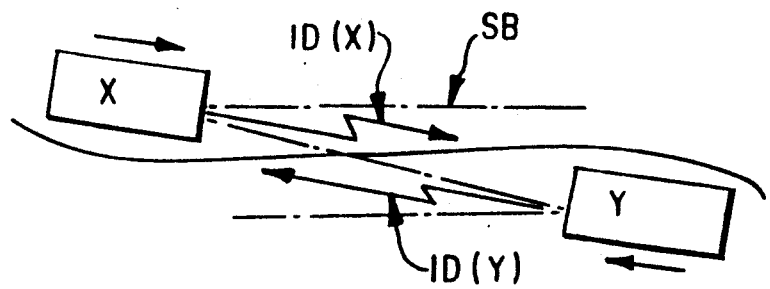

While the vehicle X travels around a bend, e.g., an S-shaped bend, it is possible that the range determining wave of the target detecting and range determining system will be directed toward another vehicle travelling in an oncoming lane, as shown in FIG. 9. If a vehicle Y, travelling in the oncoming lane, transmits a range determining wave SB′ which is the same as or similar, in frequency, to the range determining wave SB, it may interfere with the range determining wave SB transmitted from the vehicle X, as shown in FIG. 10. In other words, it is possible that the target detecting and range determining system will be unable to discriminate between its own range determining wave SB, reflected from the target vehicle Y, and the range determining wave SB′ transmitted directly from the target vehicle Y.

The inability to discriminate between two range determining waves is avoided by a target detecting and range determining system in accordance with another preferred embodiment of the present invention. This embodiment is schematically shown in FIGS. 7 and 8, and uses an identification signal.

Figure 7:
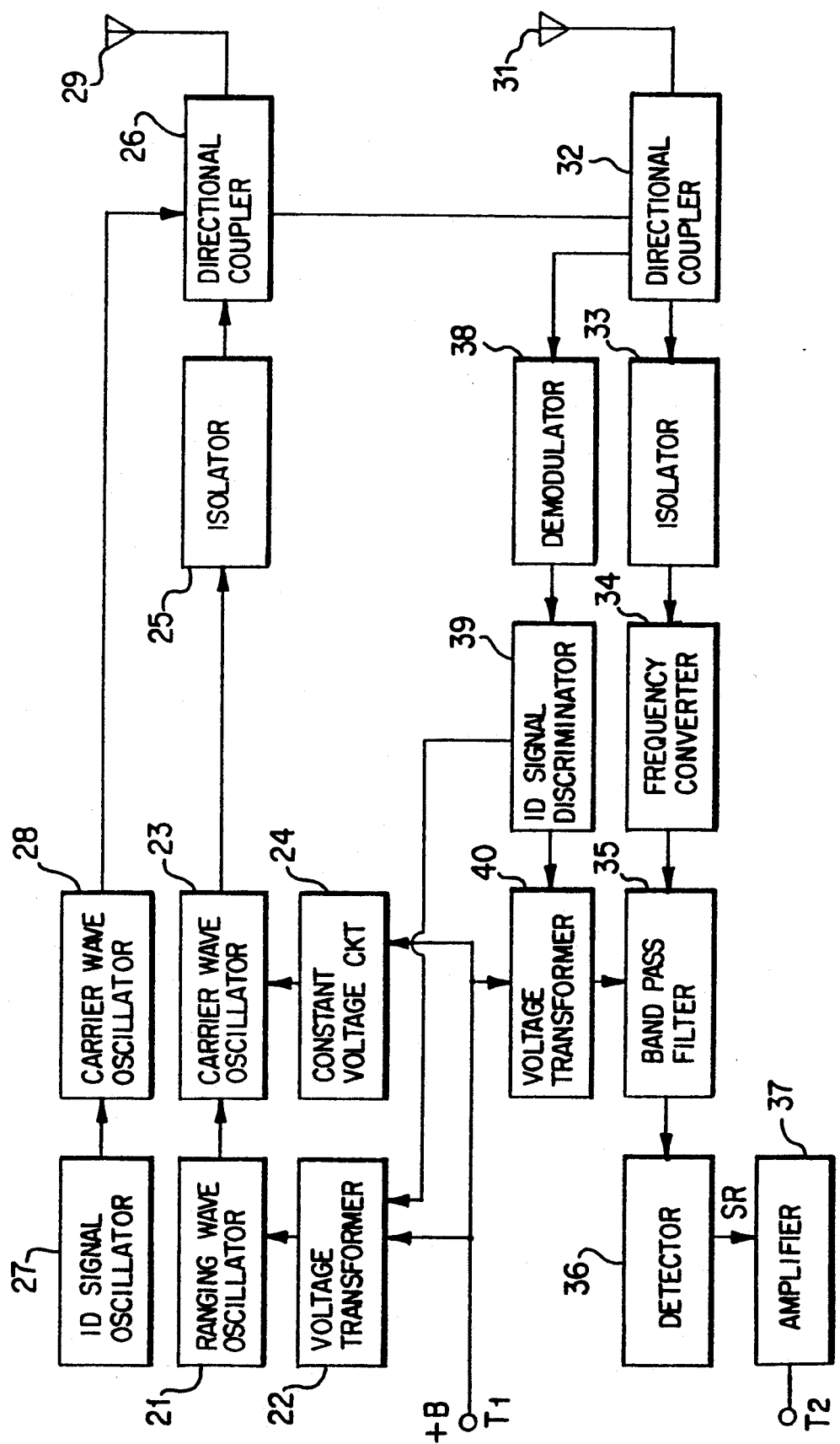
FIG. 7 is a block diagram showing a target detecting and range determining system for an automotive vehicle in accordance with another preferred embodiment of the present invention.
Figure 8:
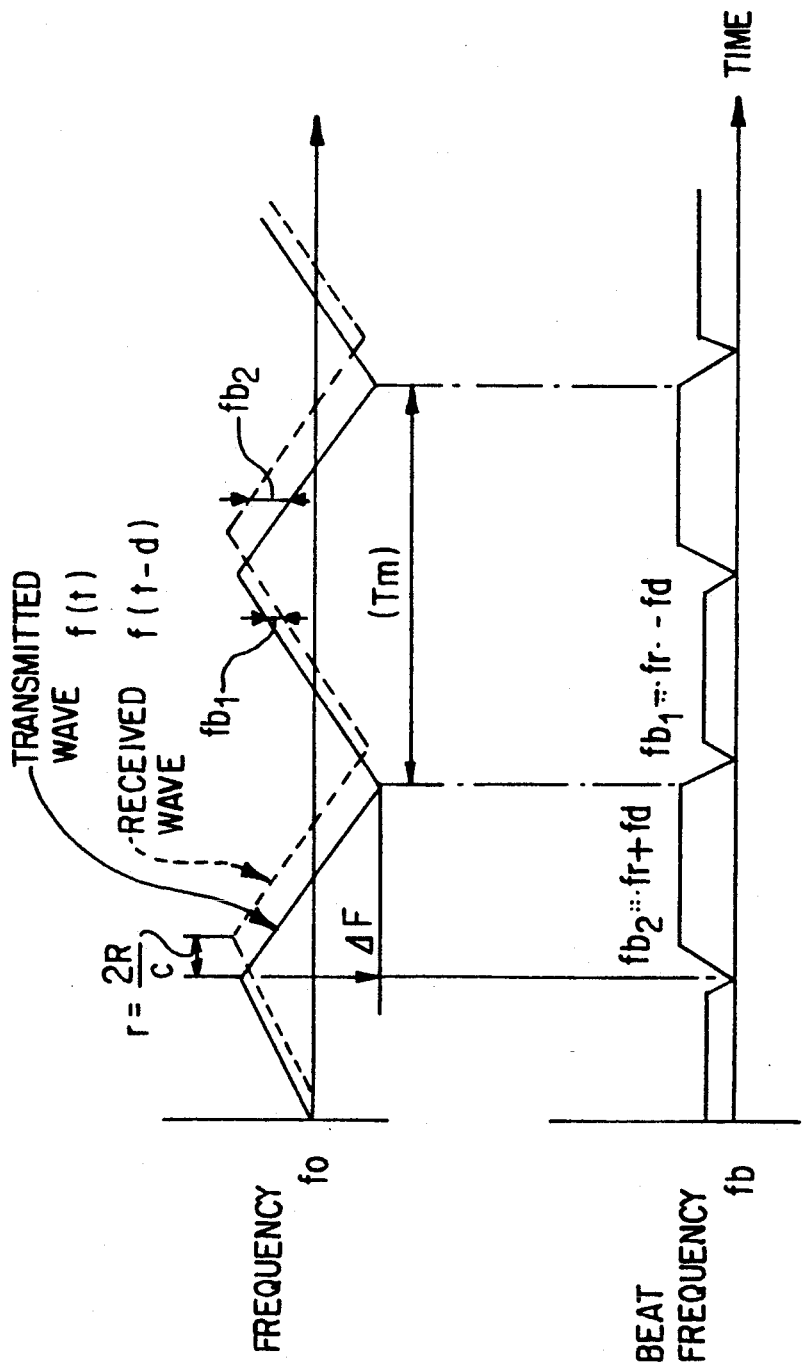
FIG. 8 is a time chart illustrating the principle enabling detection of a distance between two vehicles.

Referring to FIG. 7, the target detecting and range determining system is shown as including a range determining wave transmitter T and a range determining receiver R. The transmitter T includes an oscillator 21, such as a voltage controlled variable frequency oscillator (VCO), and generates a frequency modulated continuous wave (referred to as a range determining wave SB, for simplicity) at different frequencies. In particular, the oscillator 21, in an ordinary state, generates a range determining wave having a first frequency $f_1$ corresponding to an ordinary or first control voltage $V_1$ to which a supply voltage $+B$ at an input terminal $T_1$ is transformed by a first voltage transformer 22. On the other hand, in a specific state, such as when a discriminator 39 of the receiver R (which will be described later) detects an incorrect identification signal or other signals which provide a control voltage switching signal to the first voltage transformer 22, the first voltage transformer 22 transforms the supply voltage $+B$ to a second control voltage $V_2$, different from the first control voltage $V_1$. In this specific state, the oscillator 1 generates a second frequency $f_2$, different from the first frequency $f_1$, for the range determining wave SB, corresponding to the second control voltage $V_2$. The range determining wave SB, frequency-modulated by the oscillator 21, is transmitted to and is then further modulated by a carrier wave oscillator 23. The range determining wave SB having the first frequency $f_1$ or the second frequency $f_2$, thus modulated by the carrier wave, is transmitted through an isolator 25 to a directional coupler (waveguide) 26, connected to a transmitter antenna 29.

The system further includes an oscillator 27 which generates a frequency modulated continuous wave as an identification signal (referred to as an ID signal wave) having a distinct frequency $f_3$, which is different from the first and second frequencies $f_1$ and $f_2$. The ID signal is transmitted to and is further modulated by a carrier wave oscillator 28. The ID signal wave having the frequency $f_3$ is transmitted directly to the directional coupler 26 so as to be superimposed on the range determining wave SB in the directional coupler 26. The ID signal wave thereby forms a millimetric range determining wave SB, which is to be emitted or transmitted from the transmitter antenna 29.

The receiver R includes a receiver antenna 31 for receiving the range determining wave SB reflected by a target vehicle traveling in front of the primary vehicle. The reflected range determining wave SB is received by a second directional coupler (waveguide) 32, which is the same in structure and function as the first directional coupler (waveguide) 26, connected to the first directional coupler (waveguide) 26. An ID signal wave is separated from the range determining wave SB in the second directional coupler 32. The ID signal wave and the range determining wave SB are transmitted to a demodulator 38 and an isolator 33, respectively. The range determining wave SB transmitted to the isolator 33 is filtered by a band pass filter 35 having a filter constant which is changed, as will be described later, after being converted in frequency convertor 34. The band pass filter 35 permits a wave, having a frequency specified by the filter constant of the band pass filter 35, to pass to a range detector 36. The range detector 36 determines a distance between the primary vehicle X and the target vehicle traveling ahead of the primary vehicle X.

On the other hand, the ID signal wave, which is demodulated in the demodulator 38, is transmitted to and discriminated, based on its frequency, from other signals, including other identification signal waves emitted from other vehicles, by an identification signal (ID) discriminator 39. When the ID signal has the same frequency as the third frequency $f_3$ of the ID signal wave emitted from the transmitter T of the system it is judged that the ID signal wave is a true component of the range determining wave SB emitted from the transmitter antenna 29 and properly reflected by a target vehicle.

If in fact the true ID signal wave is detected, the ID discriminator 39 provides a control voltage switching signal to a second voltage transformer 40 rather than to the first voltage transformer 22. In the presence of the control voltage switching signal, the second voltage transformer 40 transforms the supply voltage $+B$ to a specific predetermined voltage in order to vary the filter constant of the band pass filter 35 corresponding to the first frequency $f_1$. A vehicle distance based on the reflected range determining wave having the first frequency $f_1$ is thereby determined. However, if a wrong ID signal wave is or other signal waves are detected, the ID discriminator 39 provides a control voltage switching signal to the first voltage transformer 22 rather than to the second voltage transformer 40. In the presence of the control voltage switching signal, the first voltage transformer 22 transforms the supply voltage $+B$ to the second control voltage $V_2$ so that the oscillator 1 generates the range determining wave SB at the second frequency $f_2$, which is different from the first frequency $f_1$. The second frequency corresponds to the second control voltage $V_2$. On the other hand, upon removal of the control voltage switching signal, the second voltage transformer 40 transforms the predetermined specific voltage to the supply voltage $+B$ in order to vary the filter constant of the band pass filter 35 corresponding to the second frequency $f_2$. A vehicle distance, based on the reflected range determining wave having the second frequency $f_2$, is thereby determined.

The distance detector 16 detects a distance between the two moving vehicles, based on the filtered range determining wave SB, in a manner which is well known in the radar art, and provides a distance signal representative of the vehicle distance. As is shown in FIG. 8, for instance, the distance detector 36 can form a beat frequency $F(fb_1-fb_2)$ from the relationship of frequency relative to time delay (d) between the transmission of the range determining wave signal $f(t)$ and the reception of the reflected range determining wave $f(t-d)$. The distance detector 36 calculates a vehicle distance corresponding to the beat frequency $F(fb_1-fb_2)$, in a manner which is well known in the radar art, to provide a distance signal SR representative of the vehicle distance. The distance signal is amplified to a predetermined level by an amplifier 37. The distance signal SR is then compared with a reference distance signal representative of a predetermined critical vehicle distance and provides, if necessary, a warning when vehicle distances shorter than the predetermined critical vehicle distance are present. A warning circuit may be connected to a terminal $T_2$ of the system.

Referring to FIG. 10, if the primary vehicle X and an oncoming target vehicle Y, having similar target detecting and range determining systems, travel in opposite directions on, for instance, an S-shaped bend or path, the system of the primary vehicle X will possibly receive not only its own range determining wave SB, reflected by the target vehicle Y, but also a range determining wave emitted directly from the target vehicle Y. If the range determining waves emitted from the vehicles X and Y have the same or similar frequencies, the system of the vehicle X, if it contains no ID signal wave, will be unable to discriminate between its own range determining wave and the range determining wave emitted from the target vehicle. According to the present invention, however, the system discriminates between "right" and "wrong" range determining waves, even though a target detecting and range determining system of the target vehicle Y emits a range determining wave which has a frequency the same as or similar to that of the range determining wave of the system of vehicle X. This is because the system of the target vehicle Y has an ID signal ID(Y) which is different in frequency from the ID signal ID(X) of the system of the vehicle X. In other words, the system of the vehicle X emits its range determining wave containing the ID signal wave ID(X) and receives a reflected range determining wave. If the ID discriminator 39 detects an ID signal wave, for example, the ID signal wave ID(Y), which is different in frequency from the ID signal wave ID(X), a control voltage switching signal is provided to the first voltage transformer 22. As a result, the transformer 22 transforms its control voltage from the first voltage $V_1$ to the second voltage value $V_2$. Consequently, the oscillator 21 changes the frequency of its range determining wave from the first frequency $f_1$ ("A" channel) to the second frequency $f_2$ ("B" channel). On the other hand, since no control voltage switching signal is provided for the second voltage transformer 40, the filter constant of the band pass filter 35 varies so as to pass the range determining waves having the second frequency $f_2$. Consequently, the system of the vehicle X determines a vehicle distance, based on the reflected range determining wave of the second frequency $f_2$ only, so that a vehicle distance is reliably detected without any influence from the range determining wave emitted from the target vehicle.

Figure 11:
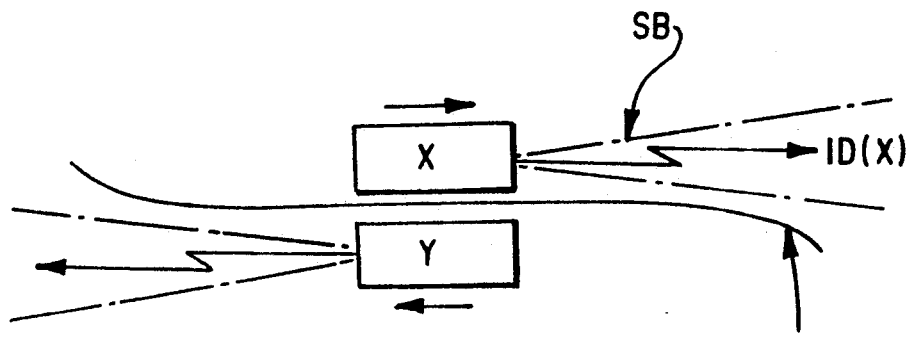

After the vehicles X and Y have passed, as shown in FIG. 11, the system of the vehicle X, because the ID signal waves ID(Y) from the vehicle Y are no longer received, generates its range determining wave SB at the first frequency $f_1$ and changes the filter constant of the band pass filter 35 so as to correspond to the first frequency $f_1$.

It is to be understood that although the present invention has been described in detail with respect to preferred embodiments thereof, various other embodiments and variants may occur to those skilled in the art. Any of these other embodiments and variants which fall within the scope and spirit of the present invention are intended to be covered by the following claims.

What is claimed is:

1. A target detecting and range determining system for an automotive vehicle for determining a distance between two vehicles travelling in front of and behind one another, said target detecting and range determining system comprising:

signal transmitting means for transmitting a range determining signal toward a target vehicle travelling ahead of a primary vehicle equipped with the target detecting and range determining system;

signal receiving means for receiving a reflected range determining signal reflected from said target vehicle so as to detect a distance of said primary vehicle from said target vehicle in accordance with at least a time from transmission of said range determining signal to reception of said reflected range determining signal; and control means for controlling said signal receiving means so that it receives said reflected range determining signal while the vehicle changes its direction of travel relative to said target vehicle, said control means comprising signal identification means for generating an identification signal having a distinct frequency which is different from that of said range determining signal, and changing means for causing said signal transmitting means to modulate the frequency of said range determining signal from one to another when said signal receiving means receives a reflection of said range determining signal containing an identification signal having another frequency, different from said distinct frequency, thereby picking up a range determining signal having the other frequency.

2. A target detecting and range determining system as recited in claim 1, wherein said control means comprises relative direction detecting means for detecting a relative direction of travel between said primary vehicle and said target vehicle to provide a direction signal representative of a change in the relative direction of travel based on a change of the reflected range determining signal, and drive means for turning said signal transmitting means and said signal receiving means together with respect to a direction in which said vehicle is travelling according to said direction signal, thereby continuously tracking said target vehicle.

3. A target detecting and range determining system for an automotive vehicle for determining a distance between two vehicles, said target detecting and range determining system comprising:

range determining means for transmitting and directing a range determining signal, at different ranging frequencies, toward a target vehicle and receiving, as a distance signal, a reflected range determining signal from the target vehicle to detect a distance between a primary vehicle, equipped with the target detecting and range determining system, and the target vehicle in accordance with a time from transmission of said range determining signal to reception of said reflected range determining signal and a phase difference between said range determining signal and said reflected range determining signal;

identification means for generating a target identification signal, having a target identification frequency which is different from a frequency of said range determining signal and superimposed on said range determining signal prior to transmission, and detecting identification signals, different in frequency from said target identification signal, from said reflected range determining signal to provide a control signal; and control means for varying said range determining signal from one ranging frequency to another ranging frequency when said control signal is present so as to find a distance between said primary vehicle and said target vehicle based on the reflected range determining signal having the other ranging frequency.

4. A target detecting and range determining system as recited in claim 3, wherein said range determining means comprises filtering means for permitting reflected range determining signals having the one ranging frequency only as a distance signal to filter therethrough when said control signal is not provided and reflected range determining signals having the other ranging frequency only as a distance signal to filter therethrough when said control signal is provided.

5. A target detecting and range determining system as recited in claim 3, wherein said range determining means comprises an oscillator for frequency modulating said range determining signal when said control signal is present.

* * * * *